W. GRIES.
LIFTING JACK.
APPLICATION FILED JAN. 17, 1917.
1,254,797.
Patented Jan. 29, 1918.
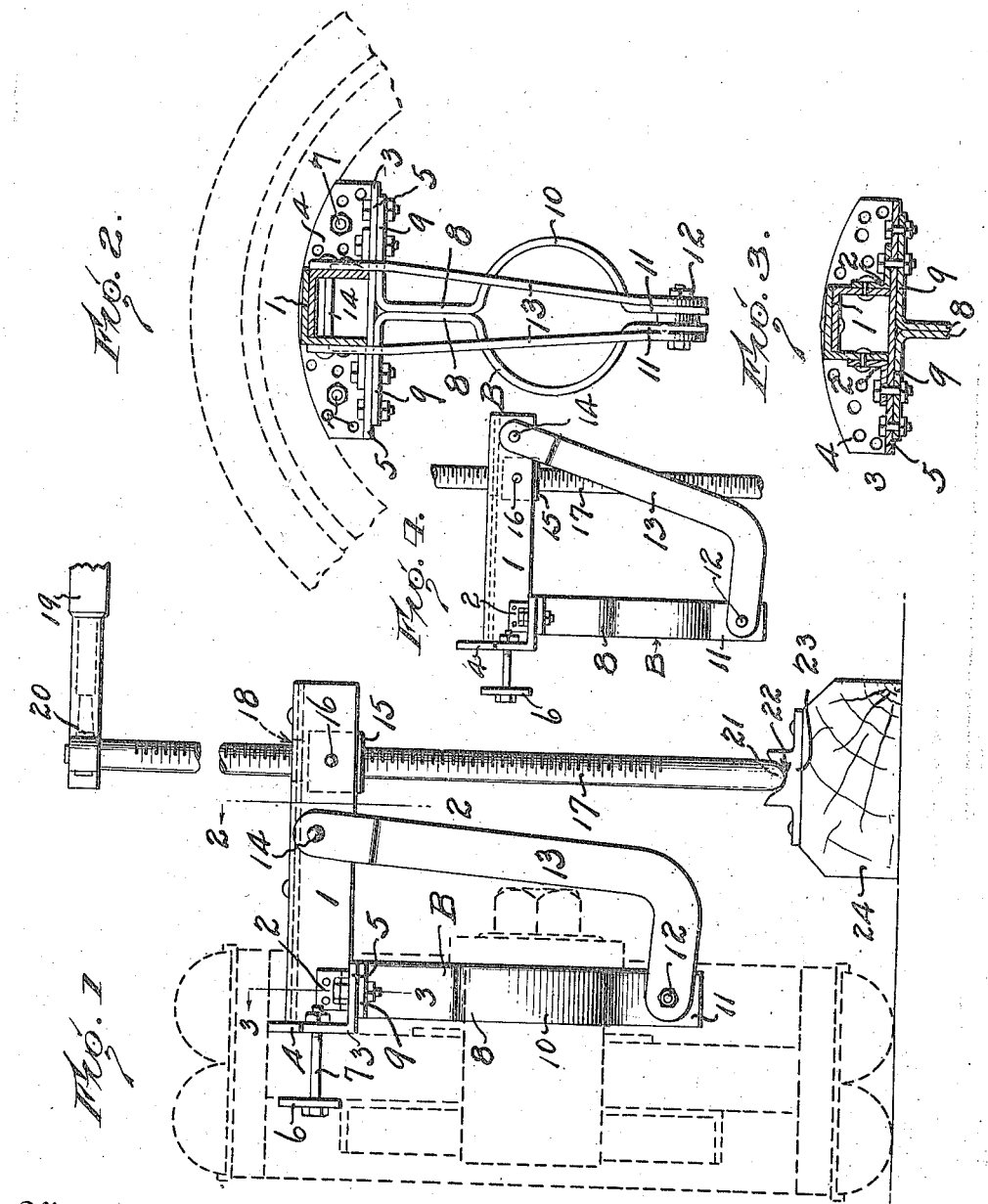
Witness
Emory L. Groff
Inventor
WILLIAM GRIES
By
L. P. Wolhaupter
Attorney

UNITED STATES PATENT OFFICE.

WILLIAM GRIES, OF NEWARK, NEW JERSEY.

LIFTING-JACK.

1,254,797.

Specification of Letters Patent.  Patented Jan. 29, 1918.

Application filed January 17, 1917. Serial No. 142,845.

*To all whom it may concern:*

Be it known that I, WILLIAM GRIES, a citizen of the United States, residing at Newark, in the county of Essex and State of New Jersey, have invented certain new and useful Improvements in Lifting-Jacks, of which the following is a specification.

This invention relates to lifting jacks, and more particularly to an improved jack so organized and so arranged as to be especially applicable for use as an emergency jack for automobiles of the heavy truck type.

To this end, the invention contemplates a novel and practical device which may be rigidly secured to the wheel of a vehicle, such as heavy motor trucks, to lift the same out of mud holes and ditches, as well as for ordinary jacking purposes. Ordinarily, automobile jacks are so constructed as to engage the axle of the machine to lift the same off the ground. However, when the machine is ditched or a wheel or wheels deeply sunk into the mud, it is impossible, as a rule to place a jack beneath the axle, or obtain a firm surface on which to rest the jack. Accordingly, the present invention purposes to provide a device which may be readily secured to and operated from the outer side of a wheel, thereby not only facilitating the manipulation of the device, but also affording a stable and convenient point of attachment to the vehicle, while at the same time enabling the operator to more readily obtain a firm base or ground to support the jack.

A further object of the invention is to provide a strong, durable and reliable construction which is particularly adapted for heavy work, and which may be easily and quickly applied, and on the other hand, readily removed and stored for future use.

With the above and other objects in view which will more readily appear as the nature of the invention is better understood, the same consists in the novel construction, combination and arrangement of parts hereinafter more fully described, illustrated and claimed.

A preferred and practical embodiment of the invention is illustrated in the accompanying drawings, in which—

Figure 1 is a side elevation of my improved jack, applied to a vehicle wheel which is shown in dotted lines.

Fig. 2 is a sectional view taken on the line 2—2 of Fig. 1.

Fig. 3 is a detail cross-sectional view on the line 3—3 of Fig. 1.

Fig. 4 is a detail side elevation of one modification.

Similar references designate corresponding parts throughout the several figures of the drawings.

In carrying the present invention into effect, it is proposed to utilize a metallic frame work, which, although primarily constructed for strength and stability, is nevertheless, relatively light and easily handled. Accordingly, it is proposed to employ a lifting beam 1, which as shown, is preferably hollow and formed of angle bars, which are securely fastened together to provide a channel formation. One end of this beam 1 has secured thereto, by means of the angle brackets 2, a relatively stout wheel-engaging member 3, which is preferably of angular cross-section, and includes the bearing flange 4 having a rounded outer edge portion, and the attaching flange 5 to which latter flange, one wing of the angle brackets 2 is secured.

From the construction described, it will be observed that the horizontally disposed lifting beam 1 is provided with or carries the member 3 which engages with the spokes of the wheel and in order to provide a simple and effective means for holding the parts of the device in operative relation to the wheel, a clamp is employed. This clamp may conveniently consist of the upper flange 4 engaging at one side of the spokes, and a separate clamping plate engaging at the opposite side of the spokes, and clamping bolts connecting the two, as plainly shown in Fig. 1 of the drawings. It simply requires the manipulation of the bolt 7 to provide for attaching and detaching the main jack parts to and from the wheel, and at the same time, the clamping elements are so arranged with reference to the wheel engaging member 3 as to provide positive and reliable means for rigidly holding and clamping the member 3 in its wheel engaging position with the main lifting beam 1 outstanding therefrom in the position shown in Fig. 1 of the drawings.

To prevent all of the strain of lifting the vehicles from being imposed on the upper portion of the wheel, and perhaps injuring the spokes, the device also includes means for engaging the hub of the wheel, whereby some of the lifting stress is transferred to the hub, as will be observed from Figs. 1 and 2. This means consists of a bracket element B, depending from the underside of the flange 5 of the wheel engaging member 3, and preferably comprises the separate strap members 8 whose upper ends 9 are securely bolted to the underside of the flange 5, while their intermediate portions are oppositely bowed to provide a substantially circular hub clamp 10. As will be seen from Fig. 2, the lower ends 11 of the strap members 8 have connected thereto, by a bolt 12, one end of the angular brace elements 13, the upper ends of which are secured as at 14 to an intermediate portion of the lifting beam 1. In addition to connecting the brace members 13 to the lower ends 11 of the straps, the bolt 12 upon being tightened, draws the rounded hub clamping portions 10 of the straps into holding position about the hub of the wheel, thus establishing the hold or grip of the entire device on the vehicle wheel.

As will be seen in Fig. 4, the upper ends of the angular brace elements 13 may be secured to the lifting beam 1 at a point beyond the pivot 16 of the nut element 15, so that the nut element will be intermediate, or the brace elements 13 may be attached coincident with the pivot 16 of the nut.

Between the point of connection of the brace element 13 with the beam and the end thereof opposite the engaging member 3, provision is made for receiving a lifting screw. That is to say, in the channel portion of the beam 1, there is mounted a nut element 15, which is carried on the pivots 16 in the opposite side walls of the beam 1, and receives the lifting screw 17 which projects through an opening 18 in the upper portion of the beam 1. This lifting screw 17 is preferably provided at its upper end with an operating handle 19, which is connected therewith by a ratchet device 20, whereby the screw may be readily turned in the nut 15 to effect the desired lifting of the beam 1. The lower end of the lifting screw is preferably rounded as at 21 and adapted to fit in a socket 22 of an abutment plate 23 and mounted on a relatively stout base 24, which is preferably a wooden block or plank, which provides a large and firm step for the screw to work against and to thereby give a point of resistance for the lifting action of the screw.

From the foregoing, it will be apparent that the present construction provides a lifting jack device which may be readily applied to the outer side of a vehicle wheel, whereby the lifting beam thereof may be located near the highest point of the wheel so that in case the wheel is ditched or deep in the mud, the lifting point, that is, the point of connection of the screw with the nut 15 in the beam, will be above the surface of the earth in which the wheel is sunk, thereby making it possible to easily place a firm bearing member beneath the beam for the lifting screw to work against. That is to say, the lifting screw may be placed in the nut 15, so that only a small portion of the lower end thereof projects below the lower edge of the nut, and then the socket element carried by the plank or other bearing element brought up to the end of the screw to thereby provide a firm and rigid point for the same to work against and exert its lifting force on the beam 1.

It will also be apparent that the present device provides for evenly and uniformly distributing the lifting strain on the vehicle wheel, while at the same time provides for rigid engagement with the wheel so that the entire device is not likely to become disengaged from the wheel during the lifting operation. In this connection it will be observed that a distinctive feature of the present invention resides in a novel lifting device which is applied to the outer side of the wheel at one end of the axle of the vehicle, thus obtaining the advantage of the axle as a lever, with the wheel at the other end of the axle constituting the fulcrum of said lever by which the ditched wheel is lifted. This feature of the invention is of practical importance and may be utilized to great advantage in the operation of lifting the wheels of heavy motor trucks out of mud holes and ditches.

Without further description, it is thought that the many features and advantages of the present invention will be readily apparent, and it will, of course, be understood that various changes in the form, proportion, and minor details of construction may be resorted to without departing from the spirit of the invention or scope of the appended claims.

I claim:

1. A lifting jack comprising a beam member having means at one end for engaging beneath a wheel felly and also having means suspended therefrom to clampingly embrace a wheel hub, and a lifting screw for the other end of said beam.

2. A lifting jack comprising a beam member carrying at one end a wheel bearing element adapted to have a lifting engagement with the felly of the wheel and also carrying a wheel hub engaging brace arranged below the wheel bearing element, and a lifting screw having a threaded engagement with the beam.

3. A lifting jack comprising a channel beam member carrying at one end a clamp and a wheel bearing element, said beam pivotally carrying near its opposite end portion a nut element, and a lifting screw engaging said nut element.

4. A lifting jack comprising a beam member having wheel-felly and wheel-hub-engaging means near one end, a pivotally supported nut element near the other end, a lifting screw engaging with said nut and disposed at an angle to the beam, a detachable bearing socket for the lower end of said screw, and ratchet operating means for the upper end of said screw 5. A lifting jack comprising a hollow beam member, an angular felly-engaging member secured to one end of said beam and having spoke clamping means associated therewith, a nut element pivotally mounted between the walls of said beam, and a lifting screw engaged with said nut and disposed at an angle to said beam.

6. A lifting jack comprising a beam member, an angular felly-engaging member secured to one end of said beam, spoke clamping means carried by said engaging member, a depending hub-engaging bracket depending from said engaging member, an annular brace element connecting the lower end of the hub engaging bracket and the intermediate portion of the beam, a nut element pivotally carried between the walls of the hollow beam member, and a lifting screw working in said nut.

7. A lifting jack comprising a channeled beam member, an angular engaging member secured to one end of said beam and having a rounded engaging outer edge portion, a spoke clamping plate, bolts for connecting said spoke clamping plate with the engaging member, a hub engaging bracket depending from one flange of said engaging member, an angular brace connecting the lower end of said hub-engaging bracket and the intermediate portion of said beam, a nut pivotally mounted between the walls of the channel beam, a lifting screw working in said nut and disposed at an angle to said beam, a separate bearing socket for one end of said screw, and means at the other end of said screw for operating the same.

8. A lifting device for axle carried wheels comprising a beam member acting as a lever and carrying at one end a clamp for engagement with the wheel and also carrying at the same end a wheel bearing element adapted to engage beneath the wheel felly above the axle, said beam member projecting outwardly from the wheel so that the axle becomes a part of the lever, and lifting means operatively connected with the outer end portion of the beam for raising and lowering the same.

In testimony whereof I hereunto affix my signature in the presence of two witnesses.

WILLIAM GRIES.

Witnesses:
ROBERT B. BRADLEY,
GEORGE STADELMAN.